United States Patent [19]

Jolin

[11] 4,336,041
[45] Jun. 22, 1982

[54] MOBILE DUST COLLECTOR USED ON QUARRIES

[75] Inventor: Marcel Jolin, Dollard des Ormeaux, Canada

[73] Assignee: Dustell Ltee, Canada

[21] Appl. No.: 203,546

[22] Filed: Nov. 3, 1980

[51] Int. Cl.³ .................. B01D 46/02; B03C 23/28
[52] U.S. Cl. .................... 55/341 R; 55/356;
55/358; 55/385 D; 55/422; 55/432; 55/472;
15/347; 15/348; 15/352; 241/79.1
[58] Field of Search .................. 55/334, 335, 341 R,
55/341 HM, 356, 358, 385 B, 385 D, 422, 432,
472, DIG. 3, 493; 15/340, 347, 348, 352;
241/79.1

[56] References Cited

U.S. PATENT DOCUMENTS

| 984,810 | 2/1911 | Green | 55/334 |
|---|---|---|---|
| 2,522,882 | 9/1950 | Lofgren | 15/352 |
| 2,646,395 | 7/1953 | Padgett | 55/385 D |
| 2,703,733 | 3/1955 | Stueven | 55/422 |
| 3,480,330 | 11/1969 | Hirs et al. | 55/432 |
| 3,653,190 | 4/1972 | Lee et al. | 55/358 |
| 3,700,284 | 10/1972 | Agnew | 55/385 D |
| 3,719,030 | 3/1973 | Blankemeyer et al. | 55/341 R |
| 3,842,461 | 10/1974 | Wurster | 15/340 |
| 3,870,489 | 3/1975 | Shaddock | 55/356 |
| 3,930,817 | 1/1976 | Stevenson et al. | 55/431 |
| 3,951,628 | 4/1976 | Eskijian | 55/356 |
| 4,010,015 | 3/1977 | Brown | 55/335 |
| 4,204,846 | 5/1980 | Brenholt | 55/493 |

FOREIGN PATENT DOCUMENTS

| 484253 | 9/1928 | Fed. Rep. of Germany | 55/356 |
|---|---|---|---|
| 54-138871 | 10/1979 | Japan | 55/341 R |
| 167367 | 6/1959 | Sweden | 55/356 |
| 627841 | 10/1978 | U.S.S.R. | 55/341 R |

Primary Examiner—David L. Lacey
Attorney, Agent, or Firm—Fishman and Van Kirk

[57] ABSTRACT

The invention relates to a mobile dust collector for use in association with mobile equipment. The dust collector is adapted to be mounted on a common platform with the mobile equipment. The dust collector includes a bottom portion and a top detachment portion. Duct means extend from the bottom portion to the equipment for capturing air over and around the equipment.

24 Claims, 4 Drawing Figures

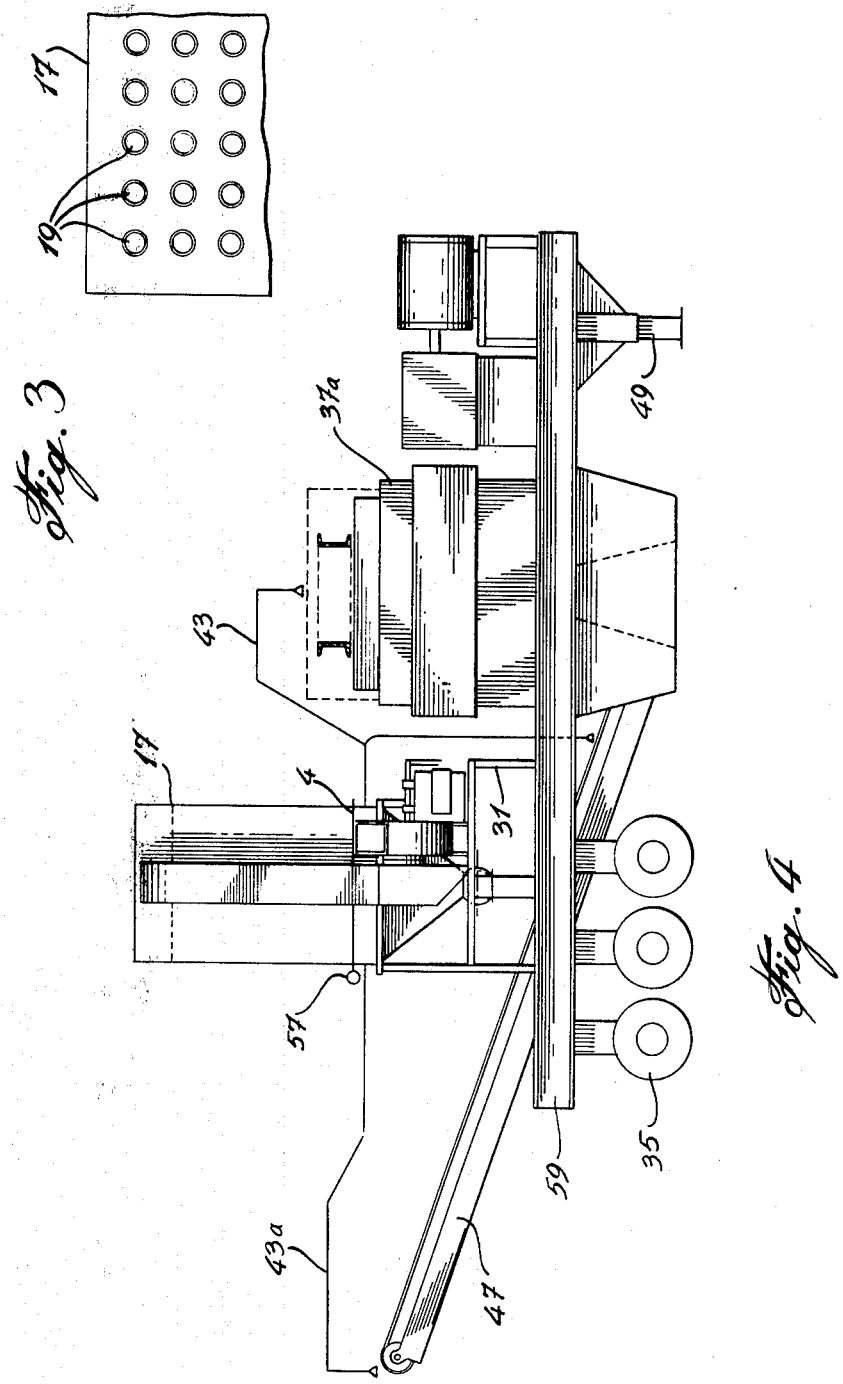

MOBILE DUST COLLECTOR USED ON QUARRIES

BACKGROUND OF INVENTION (a) Field of the Invention

The invention relates to a mobile dust collector for use in association with mobile equipment. More specifically, the invention relates to such a dust collector which is mountable on the same mobile platform which carries the mobile equipment.

The invention also relates to an arrangement of a mobile equipment and a dust collector mounted on a common platform.

The invention more specifically relates to such a dust collector for use in association with mobile quarry equipment.

(b) Description of Prior Art

In applicant's co-pending application Ser. No. 203,706 there is described a mobile dust collector for use at a quarry site and in association with such equipment as a vibrating screen. The dust collector of the co-pending application comprises a van propelled by a tractor or the like, and is large in size. It must be large to provide the heavy duty performance required at a vibrating screen.

Other equipment at a quarry, such as surge bins and crushers, which are themselves mobile, also require duct collectors. The dust collectors should also be mobile, but a dust collector of the type described in the application above-mentioned is not necessary for use with mobile quarry equipment.

SUMMARY OF INVENTION

It is therefore an object of the invention to provide a dust collector for use in association with mobile equipment.

It is a more specific object of the invention to provide a dust collector for use in association with mobile quarry equipment.

It is an even more specific object of the invention to provide such a dust collector which is mountable on the same platform as the mobile equipment.

Finally, it is an object of the invention to provide an arrangement which includes a mobile dust collector and a mobile equipment mounted on a common platform.

In accordance with a specific embodiment of the invention, there is provided a mobile dust collector in association with mobile equipment and adapted to be mounted on a common platform with said equipment; said dust collector comprising: a bottom portion and a top detachable portion; duct means extending from said bottom portion to said equipment for capturing air over and around said equipment.

In accordance with a more specific embodiment of the invention, there is provided a mobile dust collector for use in association with mobile equipment and adapted to be mounted on a common platform with said equipment; said dust collector comprising: a filter chamber; filter means in said filter chamber; a fan; means communicating said fan with the interior of said filter chamber; means communicating outside air with the interior of said filter chamber; wherein, said filter chamber comprises two portions detachable from each other; a first one of said portions comprising said filter means; the second one of said portions comprising said means for communicating outside air with the interior of said filter chamber.

From a different aspect, and in accordance with the invention, there is provided an arrangement of a mobile equipment and a dust collector mounted on a common platform, wherein: said equipment is mounted at one end of said platform and said dust collector is mounted adjacent said equipment on said platform and in the direction of the other end thereof; said dust collector comprising a bottom portion and a top detachable portion; duct means extending from said bottom portion to said equipment for capturing air over and around said equipment.

BRIEF DESCRIPTION OF DRAWINGS

The invention will be better understood by an examination of the following description together with the accompanying drawings in which:

FIG. 3 illustrates the plate in the filter chamber of FIGS. 1 and 2; and

FIG. 4 illustrates a second embodiment of the invention.

DESCRIPTION OF PREFERRED EMBODIMENTS

Figure 1:
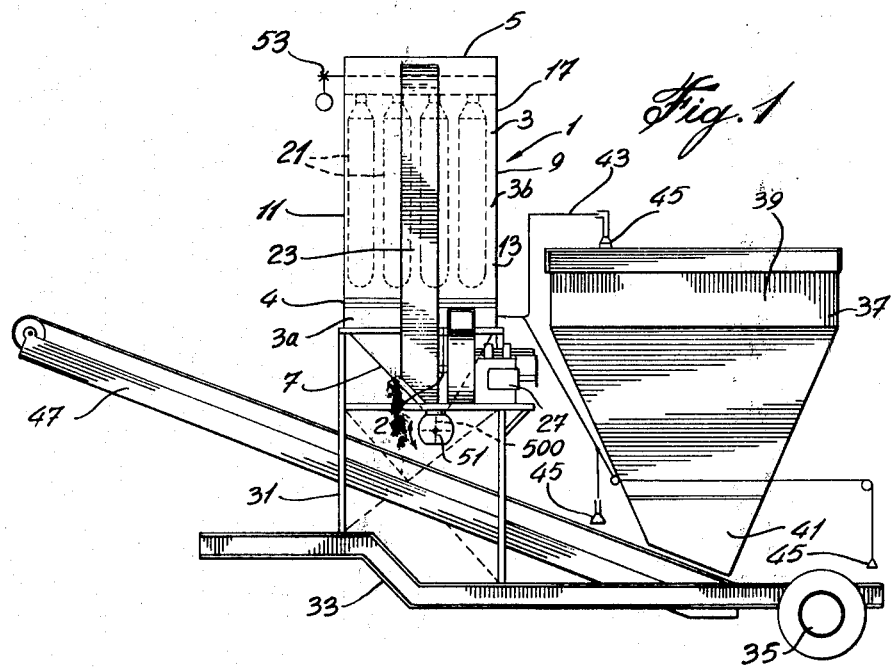
FIG. 1 is a side view of one embodiment of the invention.
Figure 2:
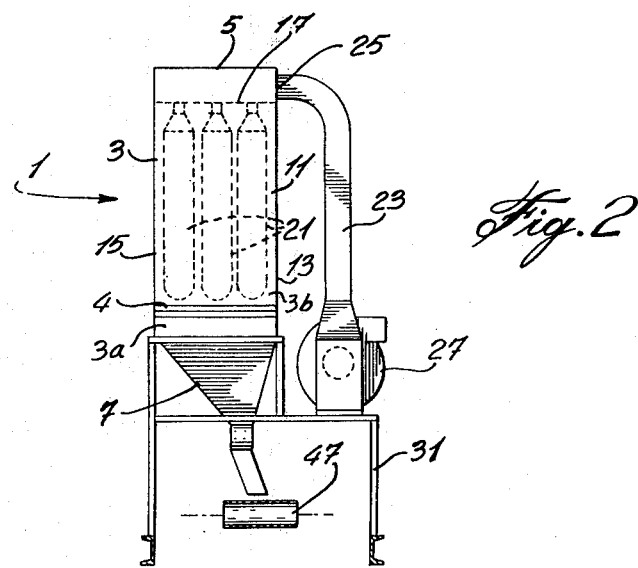
FIG. 2 is an end view of FIG. 1.

Referring now to FIGS. 1 and 2, the dust collector, illustrated generally at 1, includes a filter chamber 3 having a first portion 3a and a second detachable portion 3b. The portions a and b may be connected together by collar means 4.

As can be seen, the filter chamber includes a top wall 5, a bottom closure 7, front and back walls 9 and 11 respectively, and opposing side walls 13 and 15.

Disposed within the filter chamber is a plate 17 which is better illustrated in FIG. 3. As can be seen, the plate 17 includes a plurality of openings 19. As seen in FIGS. 1 and 2, a separate filter bag 21 extends from each opening 19 in the plate 17 downwardly and into the filter chamber.

Duct means 23 are connected, at one end thereof, to opening 25 in side wall 13 of the top portion 3b. The duct means is connected, at the other end thereof, to a fan 27, whereby the duct means communicates the fan with the interior of the filter chamber. As can be seen, the opening 25 is disposed between the top wall 5 and the plate 17 of the portion 3b. The duct means 23 extend downwardly along side wall 13 to below the top portion 3b.

The dust collector is mounted on a collector platform 31, and the collector platform is mounted on a common platform 33 which includes wheel means 35 at one end thereof. The wheel means can include two or four tires as required. As can be seen, the mobile equipment 37, which in FIG. 1 is a surge bin, is also mounted on the common platform.

The mobile equipment has an inlet end 39 and an outlet end 41. Duct work 43 connected to an opening in a front wall of bottom portion 3a extends over and around the mobile equipment. Specifically, the duct work includes inlets 45, one of the inlets being disposed adjacent the inlet of the mobile equipment, another one being disposed adjacent the wheel means of the common platform, and a third inlet being disposed adjacent a conveyor 47 which conveys the output of the surge bin as is well known in the art.

In operation, the invention works as follows:

When transporting the mobile equipment and dust collector from one place to another, the top detachable portion 3b is removed and placed on another position in the platform, for example, at the extreme front end of the platform. With the top detachable portion so disposed, the entire load on the platform is a low load suitable for movement, for example, along highways. At the same time, although the top portion of the filter chamber is disconnected, the bottom portion, which includes the duct work 43, remains connected so it is not necessary to reconnect the duct work every time the equipment is used.

When the equipment arrives at the work site, the top portion 3b is placed on top of the portion 3a, and the collar 4 is used to airtightly connect the top portion to the bottom portion.

To cleanse the air when the surge bin is in operation, the fan is turned on and draws air from over and around the search bin through the inlets 45, through the duct 43, and up through the filter chamber. Dust is collected on the outside surface of the filter bags which, in the preferred arrangement, are similar to the filter bags as described in the afore-mentioned co-pending application. The air minus the dust passes through the filter bags and up through the openings 19 and thence into the duct 23 and to the fan 27 to be flown back out into the environment without the dust.

The member 500 (see FIG. 1) in the valve 51 is continuously rotatable either in the clockwise or counter-clockwise position as shown by the arrow. With this arrangement, dust which falls down to the valve will be explained from the filter chamber, however, air will not be allowed to enter the chamber through the valve.

To cleanse the filter bags, air under pressure is applied at inlet 53 between the top wall 5 and the plate 17, and the air under pressure is forced through the filter bags to blow the air off. The dust blown off will then escape through the valve 51.

As can be seen, the bottom closure is preferably in somewhat the shape of an inverted, truncated four-sided pyramid for reasons as described in the afore-mentioned co-pending application. The valve 51 is disposed at the bottom end of the inverted pyramid.

Turning now to FIG. 4, the arrangement shown in FIG. 4 includes a dust collector mounted on a platform with a crusher 37a. In the embodiment illustrated in FIG. 4, the top portion of the filter chamber is connected to the bottom portion by means of a hinge 57. In the transport position, the top portion is merely pivoted forwardly and downwardly so that it rests at the rear end 59 of the platform.

The FIG. 4 embodiment also includes a duct 43a extending over the conveyor 47. Further, in the FIG. 4 embodiment, a stand 49 is disposed at the front end of the common platform. Because the load on the FIG. 4 embodiment is heavier than the load on the FIGS. 1 and 2 embodiment, the wheel means 35 in FIG. 4 comprise three sets of wheels.

In all other respects, and in the method of operation, the FIGS. 1 and 2 and the FIG. 4 embodiments are identical.

The filter chamber is disposed in a vertical position for the same reasons as discussed in the aforementioned co-pending application.

Although several embodiments have been above-described, this was for the purpose of illustrating, but not limiting, the invention. Various modifications which will come readily to the mind of one skilled in the art, are within the scope of the invention as defined in the appended claims.

I claim:

1. A combination consisting of a mobile dust collector and mobile equipment mounted on a common platform, said mobile equipment comprising equipment which generates dust in the operation thereof such as, for example, surge bins and crushers;

said equipment is mounted at one end of said platform and said dust collector is mounted adjacent said equipment on said platform and in the direction of the other end thereof;

said dust collector comprising a bottom portion and a top portion;

means for detachably connecting said top portion to said bottom portion;

duct means extending from said bottom portion to said equipment and positioned and arranged with respect to said equipment so as to capture air over and around said equipment and to communicate the air to the interior of said collector, and wheel means on said platform for rollingly supporting said platform.

2. A combination as defined in claim 1 wherein said top portion comprises a filter chamber having filter means in the interior thereof.

3. A combination as defined in claim 2 wherein said filter chamber comprises a top wall;

a plate means, spaced inwardly from said top wall and transversing said filter chamber, said plate means comprising a plurality of openings;

wherein, said filter means comprises a separate filter bag connected to each one of said openings, each filter bag extending from said plate and inwardly into said filter chamber.

4. A combination as defined in claim 2 wherein said top portion comprises at least one end wall having an opening therein;

said dust collector further including a fan;

duct means extending from said opening in said end wall along said filter chamber and downwardly below said top portion to said fan whereby to communicate said fan with the interior of said filter chamber.

5. A combination as defined in claim 1 wherein said bottom portion comprises a bottom wall;

a valve means disposed in said bottom wall;

and wherein said top portion comprises a top wall and plate means spaced inwardly from said top wall and transversing said top portion, and at least one end wall;

air inlet means in said at least one end wall between said top wall and said plate means.

6. A combination as defined in claim 5 wherein said bottom wall is in the shape of an inverted, truncated four-sided pyramid;

said valve means being disposed at the bottom end of said bottom wall.

7. A combination as defined in claim 6 wherein said detachable connecting means comprises collar means.

8. A combination consisting of a mobile dust collector and mobile equipment mounted on a common platform, said mobile equipment comprising equipment which generates dust in the operation thereof such as, for example, surge bins and crushers;

said dust collector comprising;

a bottom portion and a top portion;

means for detachably connecting said top portion to said bottom portion;

duct means extending from said bottom portion to said equipment and positioned and arrange with respect to said equipment so as to capture air over and around said equipment and to communicate the air to the interior of said dust collector; and wheel means on said platform for rollingly supporting said platform.

9. A combination as defined in claim 8 wherein said top portion comprises a filter chamber having filter means in the interior thereof.

10. A combination as defined in claim 9 wherein said filter chamber comprises a top wall;

a plate means, spaced inwardly from said top wall and transversing said filter chamber, said plate means comprising a plurality of openings;

wherein, said filter means comprises a separate filter bag connected to each one of said openings, each filter bag extending from said plate and inwardly into said filter chamber.

11. A combination as defined in claim 9 wherein said top portion comprises at least one end wall having an opening therein;

said dust collector further including a fan;

duct means extending from said opening in said end wall along said end wall and downwardly to below said top portion to said fan whereby to communicate said fan with the interior of said filter chamber.

12. A combination as defined in claim 8 wherein said bottom portion comprises a bottom wall;

a valve means disposed in said bottom wall.

13. A combination as defined in claim 12 wherein said bottom wall is in the shape of an inverted, truncated four-sided pyramid;

said valve means being disposed at the bottom end of said bottom wall.

14. A combination as defined in claim 13 wherein said detachable connecting means comprises collar means.

15. A combination consisting of a mobile dust collector and mobile equipment mounted on a common platform, said mobile equipment comprising equipment which generates dust in the operation thereof such as, for example, surge bins and crushers;

said dust collector comprising:

a filter chamber;

filter means in said filter chamber;

a fan;

means communicating said fan with the interior of said filter chamber;

means communicating outside air with the interior of said filter chamber;

an inlet of said means communicating outside air being disposed adjacent said dust generating equipment;

wherein said filter chamber comprises a first, lower portion, said means for communicating outside air being disposed on said first portion; and a second, upper portion, said filter means being disposed in said second portion;

means for detachably connecting said second portion to said first portion;

wheel means on said platform for rollingly supporting said platform.

16. A combination as defined in claim 15 wherein said detachable connecting means comprises collar means.

17. A combination as defined in claim 15 wherein said second portion is defined by at least two side walls and two end walls;

an opening in one of said end walls;

wherein, said means communicating said fan with the interior of said filter chamber comprises a duct, extending along said filter chamber and downwardly to below said second portion, and connected at one end to said opening in said end wall and, at the other end, to said fan.

18. A combination as defined in claim 15 wherein said first portion comprises at least two end walls, an opening in one of said end walls;

wherein, said means communicating outside air with the interior of said filter chamber comprises duct means connected to said opening in said end wall.

19. A combination as defined in claim 15 wherein said second portion comprises a top wall;

plate means, spaced downwardly from said top wall and transversing said filter chamber, said plate means comprising a plurality of openings;

wherein said filter means comprises a separate filter bag connected to each one of said openings, each filter bag extending from said plate means and downwardly into said second portion.

20. A combination as defined in claim 15 wherein said first portion comprises a bottom wall;

a valve means disposed in said bottom wall;

and wherein said second portion comprises a top wall and plate means spaced inwardly from said top wall and transversing said first portion, and at least one end wall;

air outlet means in said end wall between said top wall and said plate means.

21. A combination as defined in claim 6 wherein said bottom wall is in the shape of an inverted truncated four-sided pyramid;

said valve means being disposed at the bottom end of said bottom wall.

22. A combination consisting of a mobile dust collector and mobile equipment mounted on a common platform, said mobile equipment comprising equipment which generates dust in the operation thereof such as, for example, surge bins and crushers;

said dust collector comprising:

a filter chamber;

filter means in said filter chamber;

a fan;

means communicating said fan with the interior of said filter chamber;

means communicating outside air with the interior of said filter chamber;

an inlet of said means communicating outside air being disposed adjacent said dust generating equipment;

wherein said filter chamber comprises a first, lower portion, said means for communicating outside air being disposed on said first portion; and a second, upper portion, said filter means being disposed in said second portion;

means for hingedly connecting said second portion to said first portion whereby said second portion is pivotable away from said first portion;

wheel means on said platform for rollingly supporting said platform.

23. A combination consisting of a mobile dust collector and mobile equipment mounted on a common platform, said mobile equipment comprising equipment which generates dust in the operation thereof such as, for example, surge bins and crushers;

said equipment is mounted at one end of said platform and said dust collector is mounted adjacent said equipment on said platform and in the direction of the other end thereof;

said dust collector comprising a bottom portion and a top portion;

wherein said top portion is hingedly connected to said bottom portion whereby said top portion is pivotable away from said bottom portion;

duct means extending from said bottom portion to said equipment and positioned and arranged with respect to said equipment so as to capture air over and around said equipment and to communicate the air to the interior of said dust collector; and wheel means on said platform for rollingly supporting said platform.

24. A combination consisting of a mobile dust collector and mobile equipment mounted on a common platform, said mobile equipment comprising equipment which generates dust in the operation thereof such as, for example, surge bins and crushers;

said dust collector comprising;

a bottom portion and a top portion;

said top portion being hingedly connected to said bottom portion whereby said top portion is pivotable away from said bottom portion;

duct means extending from said bottom portion to said equipment and positioned and arrange with respect to said equipment so as to capture air over and around said equipment and to communicate the air to the interior of said dust collector; and wheel means on said platform for rollingly supporting said platform.

* * * * *